US010470146B2

(12) United States Patent
Lalam et al.

(10) Patent No.: US 10,470,146 B2
(45) Date of Patent: Nov. 5, 2019

(54) METHOD FOR SYNCHRONISING A GATEWAY IN A LORA NETWORK

(71) Applicant: SAGEMCOM BROADBAND SAS, Rueil Malmaison (FR)

(72) Inventors: Massinissa Lalam, Rueil Malmaison (FR); Thierry Lestable, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 0 days.

(21) Appl. No.: 16/070,431

(22) PCT Filed: Jan. 17, 2017

(86) PCT No.: PCT/EP2017/050896
§ 371 (c)(1),
(2) Date: Jul. 16, 2018

(87) PCT Pub. No.: WO2017/129447
PCT Pub. Date: Aug. 3, 2017

(65) Prior Publication Data
US 2019/0053180 A1 Feb. 14, 2019

(30) Foreign Application Priority Data
Jan. 28, 2016 (FR) .................. 16 50688

(51) Int. Cl.
*H04J 3/06* (2006.01)
*H04L 7/10* (2006.01)
(Continued)

(52) U.S. Cl.
CPC ....... *H04W 56/0015* (2013.01); *H04J 3/0635* (2013.01); *H04L 7/10* (2013.01); *H04W 72/1278* (2013.01); *H04W 88/16* (2013.01)

(58) Field of Classification Search
CPC ......... H04J 3/06–076; H04J 2011/0096; H04J 2013/0096; H04L 5/0048–0051;
(Continued)

(56) References Cited

U.S. PATENT DOCUMENTS

2005/0281247 A1 12/2005 Lim et al.
2019/0059116 A1* 2/2019 Crohas ................ H04B 17/318
370/329

FOREIGN PATENT DOCUMENTS

CN 104 394 586 A 3/2015
WO 2012/158578 A1 11/2012

OTHER PUBLICATIONS

Apr. 24, 2017 Search Report issued in International Patent Application No. PCT/EP2017/050896.

* cited by examiner

*Primary Examiner* — Timothy J Weidner
(74) *Attorney, Agent, or Firm* — Oliff PLC; R. Brian Drozd

(57) ABSTRACT

A method for synchronising a first gateway of a LoRa network, intended to enable the first gateway to function according to the class B communication mode of the LoRaWAN protocol. The method relies on at least one reception of a synchronisation frame by the first gateway, each synchronisation frame having been transmitted by a second class B gateway in the LoRa network, equipped with synchronisation means and designated by a server. The first gateway uses an instant of reception of each synchronisation frame that it receives in order to synchronise beacon transmissions used in the implementation of the class B communication mode with beacon transmissions made by other class B gateways in the LoRa network.

21 Claims, 4 Drawing Sheets

(51) Int. Cl.
  *H04W 56/00* (2009.01)
  *H04W 72/12* (2009.01)
  *H04W 88/16* (2009.01)
(58) Field of Classification Search
  CPC .......... H04L 7/0004–10; H04L 69/28; H04W 56/0005–0095; H04W 72/1278–1294; H04W 88/16
  See application file for complete search history.

METHOD FOR SYNCHRONISING A GATEWAY IN A LORA NETWORK

The invention relates to a method for synchronising a gateway in a long-range wireless network affording low energy consumption, devices and a system implementing the method.

The internet is gradually being transformed into an extended network, referred to as the "Internet of Things", connecting all kinds of objects, equipment and terminals that have become connectable. New requirements in terms of networks have then appeared, in particular requirements for wireless networks having greater coverage than conventional cellular networks and allowing to limit energy consumption dedicated to the communications of the connected equipment. Among these long-range wireless networks affording low energy consumption ("Low Power Wide Area Network (LPWAN)"), mention can be made of networks based on the LoRa (Long Range) technology. LoRa technology operates on frequency bands known by the term "ISM band" (Industry, Science and Medical) comprising frequency bands that can be used freely for industrial, scientific and medical applications.

A network based on LoRa technology (hereinafter referred to as a "LoRa network") is composed of base stations or gateways. The gateways are able to detect messages sent in their area by equipment or terminals ("end devices") and to send them to at least one centralised server ("central network server"), which will process them.

In a LoRa network an end device is not attached to a gateway. Each gateway within range of an end device can thus serve as a relay between said end device and the centralised server. If a gateway decodes a message sent by an end device (uplink), then it retransmits it to the centralised server for processing. If a message must be transmitted from a centralised server to said end device (downlink), it is the centralised server that is responsible for determining which gateway must relay the message. Each communication between a gateway and an end device of a LoRa network as described above is done using a protocol known as LoRaWAN.

Like conventional cellular networks, several types of gateway can be envisaged. Gateways generally placed at high points, referred to as macro gateways, will cover a wide geographical area. Other gateways, referred to as femto gateways, will have a smaller geographical coverage, but are used for relaying communications from end devices in areas not covered by the macro gateways, for example in buildings.

In a LoRa network, each gateway periodically emits a signal referred to as a beacon so as to provide end devices supporting it (referred to hereinafter as class B end devices) with a communication service providing a certain quality of service. It is necessary for all the beacons sent by the gateways in a LoRa network to be synchronised with each other. Such synchronisation is in general obtained by a slaving of each gateway (i.e. of a clock of each gateway) to a reference signal, such as a GPS (Global Positioning System) radio signal. Such a synchronisation solution requires firstly for each gateway to have synchronisation means such as means for decoding the synchronisation signal (for example a GPS module) and secondly for each gateway to be in a situation to be able to receive said synchronisation signal.

The majority of macro gateways are equipped with synchronisation means, in general using the GPS radio signal. However, some macro gateways may, at least temporarily, be out of range of a GPS signal. Moreover, it is not rare for the femto gateways deployed indoors to be simply not equipped with synchronisation means. Some gateways are therefore, at least temporarily, incapable of synchronising themselves through the means traditionally used in a LoRa network.

It is desirable to overcome these drawbacks of the prior art. It is in particular desirable to propose a method enabling a gateway in a LoRa network, out of range of a reference radio signal of another technology or not having synchronisation means, to synchronise itself in order to be able to send beacons synchronised with beacons sent by class B gateways of the LoRa network.

It is moreover desirable to propose a method that is simple to implement at low cost and in particular not requiring the addition of additional modules such as a GPS module in a gateway in a LoRa network.

According to a first aspect of the present invention, the invention relates to a method for synchronising a gateway in a long-range wireless network affording low energy consumption, intended to enable said gateway to function according to a communication mode, known as class B, in which communication periods are defined from periodic emissions of beacons by each gateway in said network supporting said mode, referred to as class B gateways, the beacon transmissions being synchronised between each class B gateway, each communication period being divided into a predefined number of subperiods, an end device of the network functioning in accordance with said mode being able to communicate bidirectionally with a server by means of a class B gateway only during a subperiod that has been allocated to it. The method comprises, when it is implemented by a first gateway: sending, to said server, by means of at least one second gateway of said network, a frame comprising a synchronisation aid request, receiving a frame comprising information representing a response to said request coming from a gateway in said network, referred to as the designated gateway, equipped with synchronisation means, the designated gateway having been designated by the server among the at least one second gateway, the reception of said frame enabling the first gateway to determine at least one communication period during which the first gateway must receive a frame, referred to as the synchronisation frame, coming from said designated gateway; obtaining information representing a subperiod of each communication period determined used by the designated gateway to transmit a synchronisation frame, said subperiod having a predefined offset from a beacon directly following the communication period; receiving at least one synchronisation frame; and, for each synchronisation frame received: determining, as from an instant of receiving said synchronisation frame and the predefined offset, at least one next instant of sending a beacon for each class B gateway in said network; and transmitting a beacon at each next transmission instant determined.

In this way, the first gateway becomes, at least temporarily, a class B gateway since it can transmit beacons synchronised with the beacons of the other class B gateways in the network.

In one embodiment, before sending the frame comprising a synchronisation aid request, the first gateway checks whether at least one second gateway is within range for receiving said frame and for transmitting synchronisation frames to the first gateway, no frame comprising a synchronisation aid request being sent if no gateway is within range.

In one embodiment, following the sending of the frame comprising the synchronisation aid request, if no response to said frame is received after a predefined time, the first gateway renews its synchronisation aid request by sending a new synchronisation aid request frame.

According to a second aspect of the invention, the invention relates to a method for synchronising a gateway in a long-range wireless network affording low energy consumption, intended to enable said gateway to function in accordance with a communication mode, referred to as class B, in which communication periods are defined from periodic sendings of beacons by each gateway in said network supporting said mode, referred to as class B gateways, the sendings of beacons being synchronised between each class B gateway, each communication period being divided into a predefined number of subperiods, an end device of the network functioning in accordance with said mode being able to communicate bidirectionally with a server by means of a class B gateway only during a subperiod that was allocated to it. The method comprises, when it is implemented by the server: receiving at least one request containing a synchronisation aid request made by a first gateway and relayed by at least one second gateway; checking feasibility of synchronisation aid, synchronisation aid being possible when at least one gateway among the at least one second gateway is equipped with synchronisation means; when synchronisation aid is possible, designating a second gateway, referred to as the designated gateway, equipped with synchronisation means, for relaying to the first gateway information representing a response to the synchronisation aid request, said information allowing to establish a transmission of at least one frame, referred to as a synchronisation frame, by the designated gateway, to the first gateway, in a predetermined subperiod of at least one communication period, each transmission of a synchronisation frame enabling the first gateway to determine at least one instant of sending of a beacon synchronised with instants of transmission of beacons of each class B gateway in said network; and transmitting a request comprising said information to the designated gateway.

According to a third aspect of the invention, the invention relates to a method for synchronising a gateway in a long-range wireless network affording low energy consumption, intended to enable said gateway to function in accordance with a communication mode, referred to as class B, in which communication periods are defined from periodic sendings of beacons by each gateway in said network supporting said mode, referred to as class B gateways, the sendings of beacons being synchronised between each class B gateway, each communication period being divided into a predefined number of subperiods, an end device of the network functioning in accordance with said mode being able to communicate bidirectionally with a server by means of a class B gateway only during a subperiod that was allocated to it. The method comprises, when it is implemented by a second gateway in said network, the second gateway being of class B and being equipped with synchronisation means: receiving a request from the server comprising information representing a response to a synchronisation aid request made by a first gateway, said request having been relayed by the second gateway to said server; transmitting a frame comprising said response to the synchronisation aid request to the first gateway, said response enabling the first gateway to determine in which subperiod of at least one communication period the first gateway must receive a synchronisation frame; and transmitting at least one synchronisation frame to the first gateway in said subperiod, a reception of a synchronisation frame in said subperiod enabling the first gateway to determine at least one instant of sending a beacon synchronised with instants of transmitting beacons of each class B gateway in said network.

According to a fourth aspect of the invention, the invention relates to a method for synchronising a gateway implemented in a long-range wireless network affording low energy consumption, intended to enable a gateway to function in accordance with a communication mode, referred to as class B, in which communication periods are defined from periodic sendings of beacons by each gateway in said network supporting said mode, referred to as class B gateways, the sendings of beacons being synchronised between each class B gateway, each communication period being divided into a predefined number of subperiods, an end device of the network functioning in accordance with said mode being able to communicate bidirectionally with a server by means of a class B gateway only during a subperiod that was allocated to it. The method is implemented by a system and comprises the method according to the first aspect implemented by a first gateway, the method according to the second aspect implemented by a second gateway (12A), the second gateway being of class B and being equipped with synchronisation means and the method according to the third aspect implemented by a server.

According to one embodiment, the frame comprising the synchronisation aid request comprises a unique identifier enabling the server to determine which gateway has made the synchronisation aid request.

According to one embodiment, the subperiod used for transmitting a synchronisation frame is determined by the first gateway and the information representing a response to the synchronisation aid request comprises information representing said subperiod.

According to one embodiment, the subperiod used for transmitting a synchronisation frame is determined by the server and the frame comprising the synchronisation aid request comprises information representing said subperiod.

According to one embodiment, said method is implemented for a predetermined period.

According to one embodiment, a plurality of synchronisation frames are transmitted with a predetermined periodicity.

According to one embodiment, when the subperiod used for transmitting the synchronisation frame coincides with a subperiod attributed to the second gateway for other communications, the server, temporarily or definitively, designates another class B gateway in said network, equipped with synchronisation means, for transmitting at least one synchronisation frame to the first gateway.

According to one embodiment, prior to the sending of the frame comprising the synchronisation aid request, the first gateway transmits to the server a preliminary synchronisation aid request using a direct communication link with the server, triggering an implementation by the server of a preprocessing procedure enabling the server to determine whether it can enable the first gateway to transmit the frame comprising the synchronisation aid request.

According to one embodiment, prior to the sending of the frame comprising the synchronisation aid request, the server sends a request to the first gateway requesting the first gateway to send a frame comprising a synchronisation aid request.

According to one embodiment, the information representing a response to the synchronisation aid request comprises information enabling a plurality of gateways, comprising the first gateway, to determine at least one future instant of sending of a beacon by each class B gateway in said network and to transmit a beacon at each future sending instant determined.

According to one embodiment, the network is a LoRa network.

According to a fifth aspect of the invention, the invention relates to a device of the gateway type comprising means for implementing the method according to the first aspect.

According to a sixth aspect, the invention relates to a device of the gateway type comprising means for implementing the method according to the third aspect.

According to a seventh aspect of the invention, the invention relates to a device of the server type comprising means for implementing the method according to the second aspect.

According to an eighth aspect, the invention relates to a system comprising at least one device according to the fifth aspect, at least one device according to the sixth aspect and one device according to the seventh aspect.

The features of the invention mentioned above, as well as others, will emerge more clearly from a reading of the following description of an example embodiment, said description being given in relation to the accompanying drawings, among which:

The invention is described hereinafter in a context of a LoRa network. The invention applies, however, in other contexts for all types of long-range wireless network affording low energy consumption where the base stations send a beacon in a synchronised manner.

It should be noted moreover that we describe hereinafter a LoRa network comprising a server. The term server is here a generic term that can represent one server or a plurality of servers connected together comprising an application server suitable for managing applications used by end devices in a LoRa network.

Figure 1:
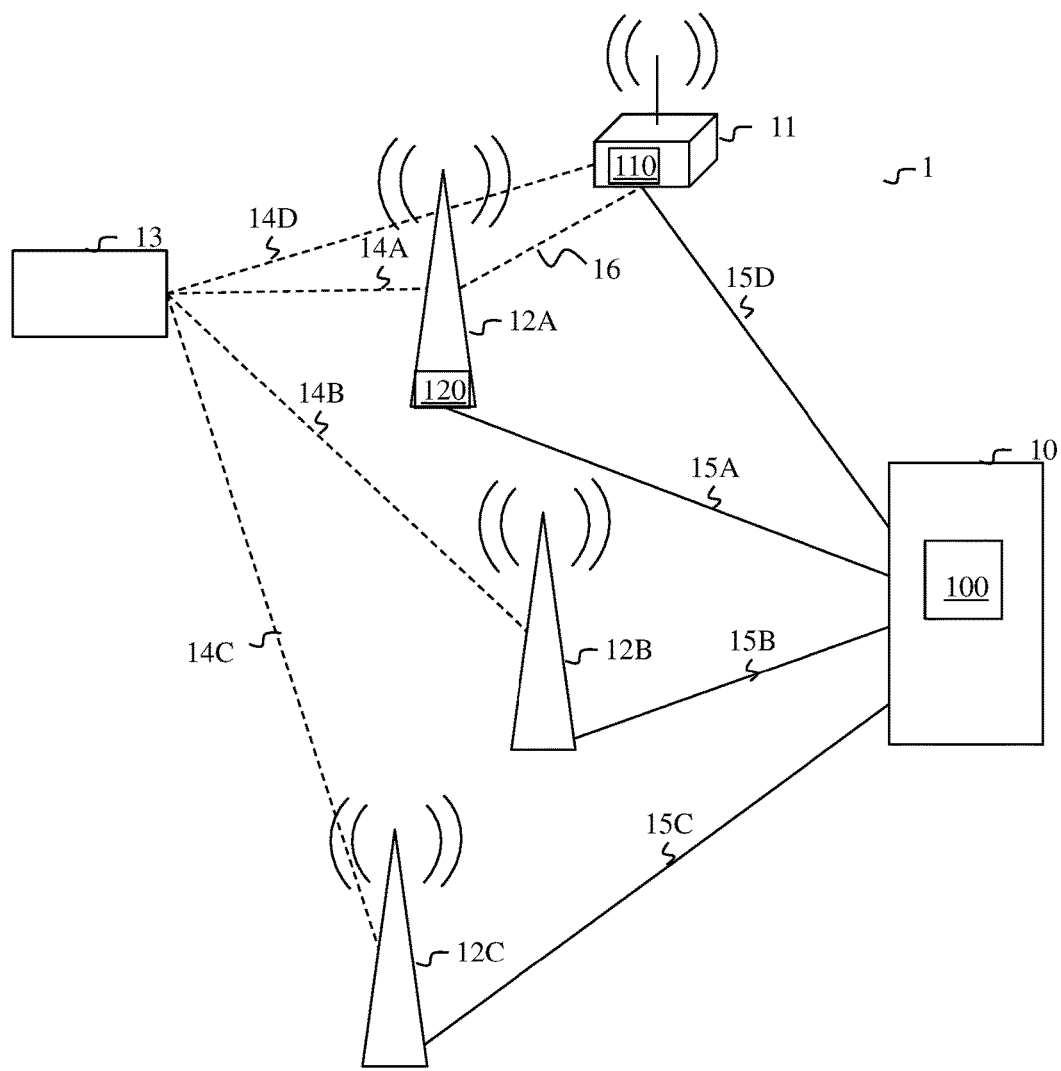
FIG. 1 illustrates schematically a LoRa network in which the invention is implemented.

FIG. 1 illustrates schematically a LoRa network in which the invention is implemented. In the example in FIG. 1, the LoRa network 1 comprises a server 10, three macro gateways 12A, 12B and 12C, a femto gateway 11 and an end device 13. The macro gateway 12A (and respectively the macro gateway 12B, the macro gateway 12C and the femto gateway 11) communicate with the server 10 by means of a communication link 15A (and respectively 15B, 15C and 15D). This link is generally a link on an IP (internet protocol) network, the physical medium of which is of little importance (cabled and/or wireless), which is hereinafter referred to as the direct link to the server 10, even if in reality a plurality of network nodes may separate a gateway from said server 10. The macro gateway 12A (and respectively the macro gateway 12B, the macro gateway 12C and the femto gateway 11) communicate with the end device 13 by means of a wireless communication link 14A (and respectively 14B, 14C and 14D) using LoRa technology. The femto gateway 11 communicates with the macro gateway 12A by means of a wireless communication link 16. The femto gateway 11 can communicate in the same way with the macro gateways 12B, 12C by means of wireless communication links that are not shown. Each communication between gateways is done using the same radio interface as the one supported by the LoRaWAN protocol for communicating with end devices. Thus a gateway is temporarily accepted as an end device.

The server 10 comprises a processing module 100. The femto gateway 11 comprises a processing module 110. Each macro gateway 12A, 12B and 12C comprises a processing module 120. Only the processing module 120 of the gateway 12A is shown.

It should be noted that the communications between the end devices and the gateways and the communications between gateways of a LoRa network use frames compatible with the LoRaWAN protocol, these frames comprise only one field able to contain an address (with the exception of the beacons, which do not comprise any address). The frames compatible with the LoRaWAN protocol are sent in a broadcast mode in the uplink direction, i.e. to the server 10; and in unicast mode or in multicast mode in the downlink direction, i.e. from the server 10. Hereinafter, frames transmitted in broadcast mode will be spoken of, the direction removing any ambiguity in a way that is obvious to a person skilled in the art. The communications between the server 10 and the gateways (macro gateways 12A, 12B and 12C and femto gateway 11) use for example a protocol of the request-based HTTP type.

When the end device 13 wishes to transmit a frame, referred to as an uplink frame, containing application data and/or control information, said uplink frame is transmitted broadcast mode. Each gateway within range of the end device 13, here the macro gateways 12A, 12C and 12B and the femto gateway 11, receives the uplink frame and inserts it in an HTTP request, referred to as the uplink HTTP request, which is transmitted to the server 10. The server 10 then receives an uplink request HTTP from each gateway that received the uplink frame. The server 10 next sends the application data to an application server associated with the end device 13 (not shown) and manages the control information.

When the server 10 must transmit application data coming from the application server and/or wishes to transmit control information to the end device 13, it creates information necessary for the creation of a downlink frame to be transmitted to the end device 13 and inserts it in an HTTP request, referred to as the downlink HTTP request, and transmits the request to a single gateway that is designates among the gateways that receive the uplink frame (here one of the macro gateways 12A, 12B or 12C or the femto gateway 11). The application data and/or the control information intended for the end device 13 are extracted from the information contained in the downlink HTTP request and are next transmitted in a frame in broadcast mode by the designated gateway to the end device 13. It should be noted that the server 10 is able to uniquely identify all the gateways in the LoRa network 1.

In the example in FIG. 1, it is assumed that the femto gateway does not have any synchronisation means but that each macro gateway has such means (such as for example a GPS module). However, the gateway that does not have a synchronisation means in the LoRa network 1 would just as well have been able to be one of the macro gateways 12A, 12B and 12C.

There exist two communication modes in a LoRa network: a first communication mode referred to as class A and a second communication mode referred to as class B.

In the class A communication mode, an end device functioning in accordance with the class A communication mode, referred to as a class A end device, that has sent an uplink frame to a server defines two reception windows following the transmission of the uplink frame. Each reception window represents a period during which the class A end device listens out for a downlink frame containing data coming from the server. The two reception windows therefore represent the only two opportunities that the server has for communicating with the end device following the sending of an uplink frame. A bidirectional transmission between the class A end device and the server can be done only at the initiative of the class A end device. This is because the class A end device listens out to receive a downlink frame only during the two reception windows in order to save on energy.

In the class B communication mode, a procedure is established so that an end device functioning in accordance with the class B operating mode, referred to as a class B end device, wakes up only at precise moments negotiated with the server. To do this, communication periods are defined. Each communication period is defined from periodic sendings of beacons by the gateways in the LoRa network, a communication period being situated between two beacons. Each communication period is divided into a number of subperiods ("ping slots") predefined by the LoRaWAN protocol. A class B end device of a LoRa network can communicate bidirectionally with the server, by means of a gateway supporting the class B communication mode, referred to as a class B gateway, only during a certain number of subperiods that have been allocated to it. In practice, in a LoRa network, the beacons are periodically sent with a period of "128 s" and subperiods of "30 ms" are distributed over a communication period of "122.880 s" following each beacon. Each subperiod of a communication period is a fixed position with respect to each of the two beacons framing said communication period. There therefore exists a separation predefined by the LoRaWAN protocol between the beacon preceding (and respectively following) a communication period and each subperiod of said communication period. It is then important for the sendings of beacons by the gateways in a LoRa network to be synchronised with each other with sufficient precision in order to support the class B communication mode without error.

It should be noted that an end device connected to a LoRa network functions by default in class A communication mode and it is at its request that it can change to a class B communication mode.

The macro gateways 12A, 12B and 12C are class B gateways. The femto gateway 11 is, initially, a class A gateway. The synchronisation method according to the invention will enable the femto gateway 11 to at least temporarily become a class B gateway.

Figure 2A:
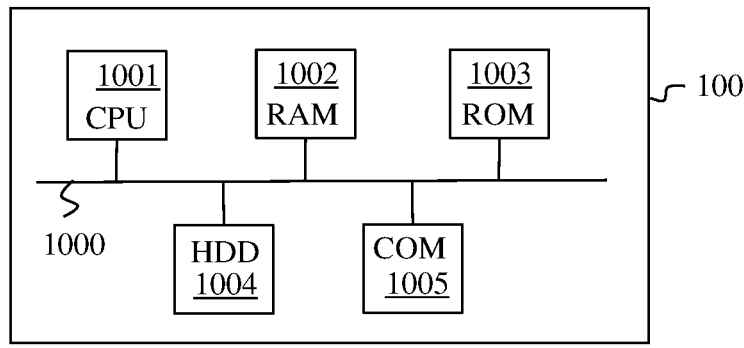
FIG. 2A illustrates schematically a processing module included in a server.

FIG. 2A illustrates schematically an example of hardware architecture of the processing module 100 included in the server 10.

According to the example of hardware architecture shown in FIG. 2A, the processing module 100 then comprises, connected by a communication bus 1000: a processor or CPU (central processing unit) 1001; a random access memory (RAM) 1002; a read-only memory (ROM) 1003; a storage unit such as a hard disk or a storage medium reader, such as an SD (secure digital) card reader 1004; at least one communication interface 1005 enabling the processing module 100 to communicate with other modules or devices. For example, the communication interface 1005 enables the processing module 100 to communicate with other modules of the server 10 or with other devices such as the macro gateways 12A, 12B, 12C and the femto gateway 11.

The processor 1001 is capable of executing instructions loaded into the RAM 1002 from the ROM 1003, from an external memory (not shown), from a storage medium (such as an SD card), or from a communication network. When the server 10 is powered up, the processor 1001 is capable of reading instructions from the RAM 1002 and executing them. In one embodiment, these instructions form a computer program causing the complete or partial implementation by the processor 1001 of the methods described below in relation to FIGS. 3A and 3B.

Figure 2B:
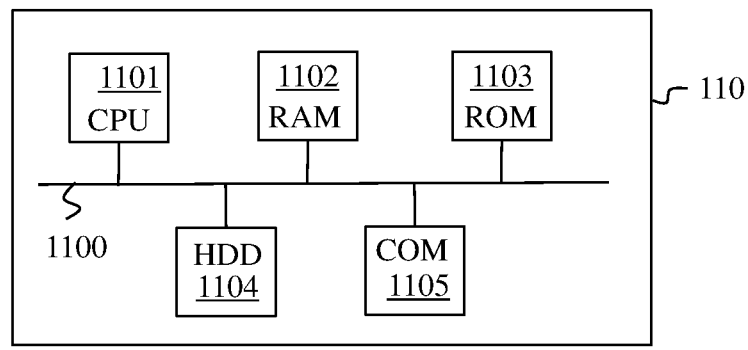
FIG. 2B illustrates schematically a processing module included in a gateway not comprising synchronisation means.

FIG. 2B illustrates schematically an example of hardware architecture of the processing module 110 included in the femto gateway 11.

According to the example of hardware architecture shown in FIG. 2B, the processing module 110 then comprises, connected by a communication bus 1100: a processor or CPU (central processing unit) 1101; a random access memory (RAM) 1102; a read-only memory (ROM) 1103; a storage unit such as a hard disk or a storage medium reader, such as an SD (secure digital) card reader 1104; at least one communication interface 1105 enabling the processing module 110 to communicate with other modules or devices. For example, the communication interface 1105 enables the processing module 110 to communicate with the server 10, with the macro gateways 12A, 12B and 12C or with the end device 13.

The processor 1101 is capable of executing instructions loaded into the RAM 1102 from the ROM 1103, from an external memory (not shown), from a storage medium (such as an SD card), or from a communication network. When the femto gateway 11 is powered up, the processor 1101 is capable of reading instructions from the RAM 1102 and executing them. In one embodiment, these instructions form a computer program causing the complete or partial implementation by the processor 1101 of the methods described below in relation to FIGS. 3A and 3B.

Figure 2C:
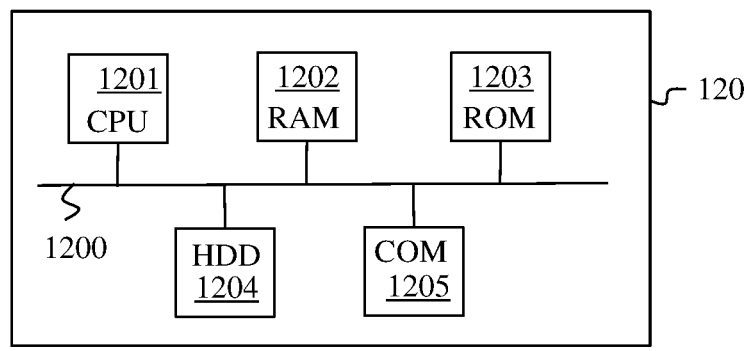
FIG. 2C illustrates schematically a processing module included in a gateway comprising synchronisation means.

FIG. 2C illustrates schematically an example of hardware architecture of the processing module 120 included in the macro gateway 12A.

According to the example of hardware architecture shown in FIG. 2C, the processing module 120 then comprises, connected by a communication bus 1200: a processor or CPU (central processing unit) 1201; a random access memory (RAM) 1202; a read-only memory (ROM) 1203; a storage unit such as a hard disk or a storage medium reader, such as an SD (secure digital) card reader 1204; at least one communication interface 1205 enabling the processing module 120 to communicate with other modules or devices. For example, the communication interface 1205 enables the processing module 120 to communicate with the server 10, with the femto gateway 11 or with the end device 13.

The processor 1201 is capable of executing instructions loaded into the RAM 1202 from the ROM 1203, from an external memory (not shown), from a storage medium (such as an SD card), or from a communication network. When the macro gateway 12A is powered up, the processor 1201 is capable of reading instructions from the RAM 1202 and executing them. In one embodiment, these instructions form a computer program causing the complete or partial implementation by the processor 1201 of the methods described below in relation to FIGS. 3A and 3B.

Figure 3A:
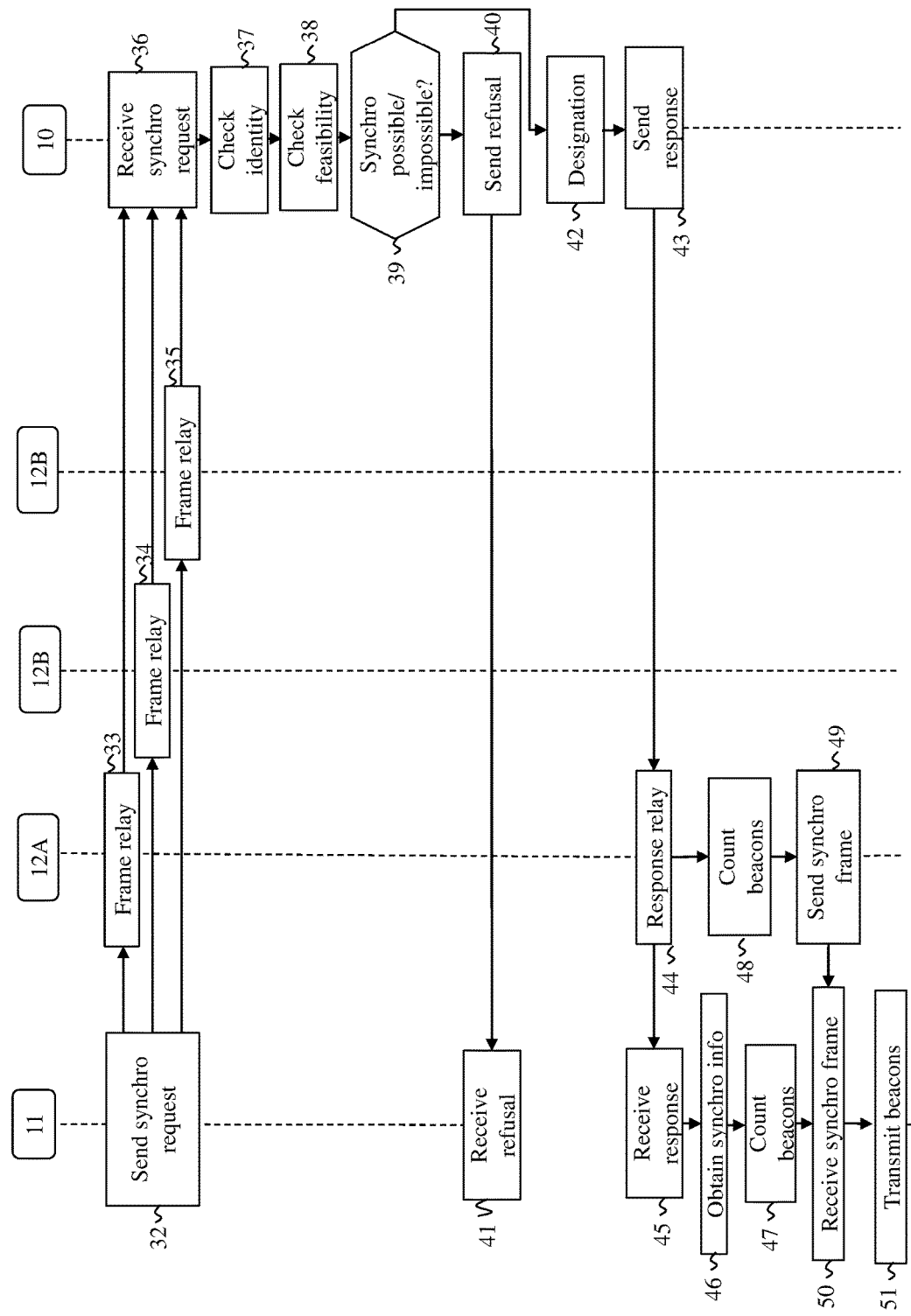
FIG. 3A illustrates schematically a first example of a method according to the invention for synchronising a gateway not having synchronisation means.
Figure 3B:
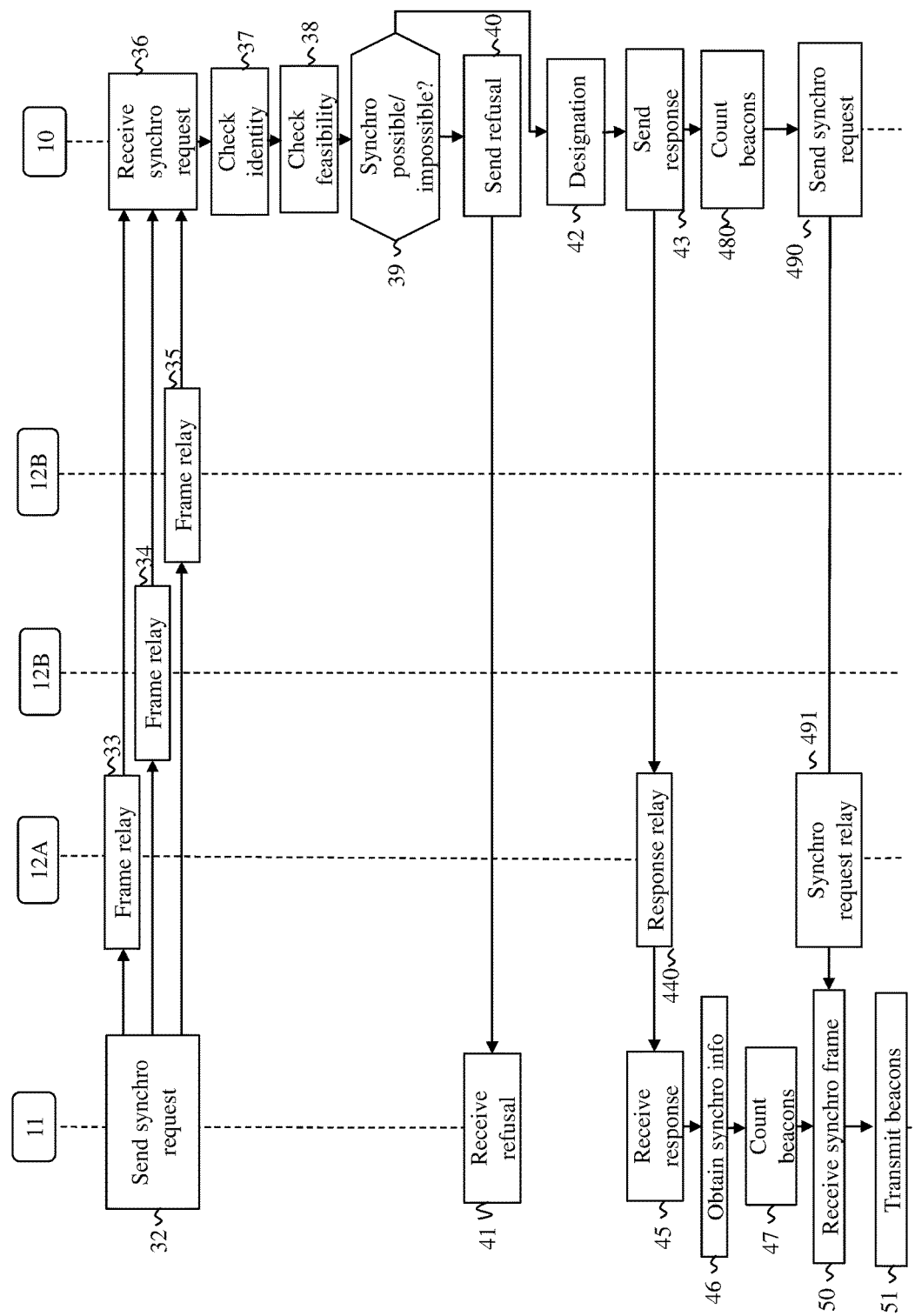
FIG. 3B illustrates schematically a second example of a method according to the invention for synchronising a gateway not having synchronisation means.

The methods described in relation to FIGS. 3A and 3B can be implemented in software form by the execution of a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit).

FIG. 3A illustrates schematically a first example of a method according to the invention for synchronising a gateway not having any synchronisation means.

In the example in FIG. 1, this method is applied in order to synchronise the femto gateway 11 so as to enable the femto gateway 11 to become a class B gateway. In this method, the femto gateway 11, not having any synchronisation means, is assisted by another gateway, here one of the gateways 12A, 12B and 12C, having synchronisation means, to effect its synchronisation.

In a step 32, the processing module 110 of the femto gateway 11 sends an uplink frame to the server 10 comprising a synchronisation aid request, referred to as a synchronisation aid request frame, by means of gateways situated in the vicinity of the femto gateway 11. To do this, the femto gateway 11 temporarily pretends to be an end device. The synchronisation aid request frame is sent in multibroadcast mode.

During steps 33, 34 and 35, a copy of the synchronisation aid request frame is received by each gateway within range of the femto gateway 11, here the macro gateways 12A, 12B and 12C. During steps 33, 34 and 35, the content of the synchronisation aid request frame is inserted by each gateway that has received said frame in an uplink HTTP request intended for the server 10. Each gateway that has received the synchronisation aid request frame next transmits an uplink HTTP request, containing the synchronisation aid request, to the server 10.

A synchronisation aid request sent at step 32 comprises a unique identifier AddID enabling the server 10 to determine which gateway has made the synchronisation aid request. The unique identifier AddID is similar to an address. It is therefore considered hereinafter that the unique identifier AddID represents an address, referred to as a synchronisation address. In the example in FIG. 1, the synchronisation aid request comprises a unique identifier AddID of the femto gateway 11. The server 10 is assumed to be able to uniquely associate a unique identifier AddID, which it would receive by means of the synchronisation aid frame, with the gateway of the LoRa network 1, which would insert said unique identifier AddID in said synchronisation aid frame. In one embodiment, each gateway in the LoRa network 1 obtains a unique identifier AddID when it is installed in the LoRa network 1.

In one embodiment, the synchronisation aid request comprises information representing a subperiod PS ("ping slot") of a communication period during which the femto gateway 11 wishes another gateway to transmit a synchronisation frame to it. It should be noted that the subperiod PS used for transmitting a synchronisation frame is situated at a fixed position in a communication period. Preferably, the subperiod PS used for transmitting a synchronisation frame is situated close to the beacon following the communication period comprising said subperiod PS. For example, said subperiod PS is the last subperiod of the communication period situated just before the sending of the beacon following the communication period comprising said subperiod PS. By taking a subperiod PS preferably situated just a little before the sending of the beacon, risks of clock drift of the femto gateway 11 during the communication period following said beacon are limited. We describe the synchronisation frames below.

In one embodiment, following the sending of the synchronisation aid request frame, the femto gateway 11 starts a time counter. If no response to the synchronisation aid request frame is received after a predefined period time out, the femto gateway 11 may decide to renew its synchronisation aid request by sending a new synchronisation aid request frame. Moreover, for example, if, after a number $N_r$ ($N_r$ being an integer number greater than 0) of synchronisation aid request renewals, no response to said request is received, the femto gateway 11 ends its synchronisation aid requests. The femto gateway is then unable to function in class B communication code.

During a step 36, the server 10 receives a plurality of uplink HTTP requests each containing the same synchronisation aid request made by the femto gateway 11 and relayed by the macro gateways 12A, 12B and 12C.

In a step 37, the processing module 100 checks that the synchronisation aid request does indeed come from a gateway in the LoRa network 1 by using the unique identifier AddID contained in said request. Step 37 is optional since it is implemented only when there exists a risk that a synchronisation aid request frame coming from a gateway in a LoRa network other than the LoRa network 1 may be received by a gateway in the LoRa network 1.

In a step 38, the processing module 100 checks feasibility of synchronisation aid. To do this, the processing module 100 checks whether at least one gateway, among the gateways in the LoRa network 1 that relayed the synchronisation aid request, is able to help the femto gateway 11 to synchronise. It is necessary in fact, for a first gateway to be able to aid the synchronisation of a second gateway, for the first gateway to be equipped with synchronisation means such as a GPS module. It is assumed here that each gateway equipped with synchronisation means has transmitted this information to the server 10. The processing module 100 is therefore capable of determining which gateway, among the macro gateways 12A, 12B and 12C, is equipped with synchronisation means. Moreover, the processing module 100 knows which gateways in the LoRa network 1 are within range of the femto gateway 11. This is because the gateways that are within range are gateways that have relayed the synchronisation aid request, i.e. the macro gateways 12A, 12B and 12C in the case of the example in FIG. 1. If at least one of the gateways that relayed the synchronisation aid request is equipped with synchronisation means, the processing module 100 considers that synchronisation aid is possible. Otherwise synchronisation aid is impossible.

In a step 39, the processing module 100 decides to accept or refuse and sends a message to the femto gateway 11 comprising information representing this decision.

When synchronisation aid is impossible, the decision taken by the processing module is a refusal. In this case, the message sent to the femto gateway 11 is a refusal message. The refusal message is for example a downlink HTTP request comprising information representing the refusal. This message is sent during a step 40 on the link 15D.

In a step 41, the processing module 110 of the femto gateway 11 receives the refusal message and ends its attempt at synchronisation.

When synchronisation aid is possible, the processing module 100 enables synchronisation aid. In this case, during a step 42, the processing module 100 designates one of the macro gateways 12A, 12B or 12C for relaying information representing a response to the synchronisation aid request.

For example, each uplink HTTP request contains information representing a quality of reception of the synchronisation aid request frame by the gateway that transmitted said uplink HTTP request. The processing module 100 designates for example the gateway that received the synchronisation aid request frame with the best quality. In the example in FIG. 1, the macro gateway 12A is designated by the processing module 100. In one embodiment, the gateway designated to respond to the synchronisation aid request is also the gateway that provides the synchronisation aid.

In a step 43, the processing module 100 transmits a downlink HTTP request comprising information representing a response to the synchronisation aid request to the macro gateway 12A. The information representing a response comprises the unique identifier AddID of the gateway that requested the synchronisation aid, here the femto gateway 11. As is described hereinafter, the information representing a response transmitted in the downlink HTTP request to the macro gateway 12A makes it possible to establish a transmission of at least one synchronisation frame by the macro gateway 12A to the femto gateway 11 in the subperiod PS of at least one communication period, thus enabling the femto gateway 11 to determine instants of sending of beacons synchronised with the instants of sending beacons from each class B gateway in the LoRa network 1.

In one embodiment, the information representing a response further comprises information representing the subperiod PS that has to be used for transmitting a synchronisation frame if this subperiod PS is not the same as the one proposed by the processing module 110 of the femto gateway 11 in the synchronisation aid request frame.

In one embodiment, the information representing a response further comprises a synchronisation address, represented by an identifier, referred to as a global identifier, PingAddID, which is an address used in the synchronisation aid frames as a destination address, the global identifier PingAddID being able to be different from the unique identifier AddID used by the femto gateway 11 in its synchronisation aid request in step 32. This may be particularly useful for example if a synchronisation aid process is already established by the server 10 for a second femto gateway (not shown in FIG. 3A) through one of the macro gateways situated in the vicinity of the femto gateway 11. Knowledge of the global identifier PingAddID used in the synchronisation frames intended for the second femto gateway enables the femto gateway 11 to be able to use them without new synchronisation frames being specifically generated for the femto gateway 11 with its unique identifier AddID. In this way, a plurality of gateways (here the femto gateway 11 and at least one other femto gateway) can synchronise themselves with the aid of the same gateway (here the macro gateway 12A) using the same synchronisation frame. The global identifier PingAddID is therefore information enabling a plurality of gateways to determine at least a next instant of sending a beacon by each class B gateway in said LoRa network 1 and to transmit a beacon at each next sending instant determined. In one embodiment, when the second femto gateway is already receiving synchronisation frames having as the destination address its unique identifier AddID equal to a value AddID_FT2, it may be judicious to use these same frames for aiding the synchronisation of the femto gateway 11. This is done by fixing the global identifier PingAddID at the value AddID_FT2 of the unique identifier AddID of the second femto gateway in the response to the synchronisation aid request of the femto gateway 11. In this way reserving global identifier values PingAddID in addition to the unique identifier values AddID is avoided.

In a step 44, the downlink HTTP request containing the information representing a response to the synchronisation aid request is received by the macro gateway 12A. Said response enables the macro gateway 12A to determine in which subperiod PS of at least one communication period the macro gateway 12A must transmit a synchronisation frame and to which addressee: either to the synchronisation address represented by the unique identifier AddID if the global identifier PingAddID is not present in the information representing a response to the synchronisation aid request, or to the synchronisation address represented by the global identifier PingAddID if the global identifier PingAddID is present in the information representing a response to the synchronisation aid request. The macro gateway 12A extracts said information and inserts it in a downlink frame intended for the gateway corresponding to the unique identifier AddID, i.e. the femto gateway 11. Said downlink frame is transmitted in multibroadcast mode.

In a step 45, the processing module 110 of the femto gateway 11 receives the downlink frame comprising the information representing a response to the synchronisation aid request frame coming from the macro gateway 12A. Reception of the downlink frame enables the femto gateway 11, by means of its processing module 110, to determine at least one communication period during which the femto gateway 11 must receive a synchronisation frame coming from the macro gateway 12A. For example, reception of the downlink frame indicates to the subgateway 11 that, after reception of a number $N_B$ of beacons, the femto gateway 11 will receive at least one synchronisation frame, coming from the macro gateway 12A in the transmission period following the reception of the number $N_B$ of beacons. The femto gateway 11 then uses each synchronisation frame received to synchronise itself. Each synchronisation frame is received in a subperiod PS of a communication period corresponding either to the subperiod PS indicated in the synchronisation aid request frame, or to the subperiod PS indicated in the downlink frame comprising the information representing a response to the synchronisation aid request. In one embodiment, the number of beacons $N_B$ is predefined and known to each gateway in the LoRa network 1. In one embodiment, the number of beacons $N_B=1$, that is to say the communication period following the next beacon received comprises one subperiod PS in which a synchronisation frame is transmitted. In one embodiment, the number of beacons $N_B=5$.

In one embodiment, the number of beacons $N_B$ forms part of the information representing a response to the synchronisation aid request. This number of beacons $N_B$ is therefore received in the downlink frame comprising the information representing a response to the synchronisation aid request.

In a step 46, the processing module 110 obtains the information representing the subperiod PS used by the macro gateway 12A for transmitting the synchronisation frame. This information is either known to the processing module 110 since it is it that defined it during step 32, or extracted from the downlink frame comprising the information representing a response to the synchronisation aid request frame received during step 45.

In the embodiment where a global identifier PingAddID is included in the information representing a response to the synchronisation aid request frame, the processing module 110 uses the synchronisation frames the destination address of which comprises the global identifier PingAddID rather than the unique identifier AddID to synchronise itself.

In a step 47, the processing module 110 starts a counter, and counts the number of beacons received following the reception of the downlink frame comprising the information representing a response to the synchronisation aid request.

Simultaneously with step 47, following the sending of the downlink frame comprising the information representing a response to the synchronisation aid request, the processing module 120 of the macro gateway 12A, during a step 48, starts a counter and counts the number of beacons sent following the transmission of said downlink frame. When the number of beacons sent reaches the number of beacons $N_B$, the processing module 120 passes to a step 49 during which it transmits a synchronisation frame in the subperiod PS of the next communication period. If, prior to the reception of the last downlink HTTP request containing information representing a response to the synchronisation aid request, the processing module 120 of the macro gateway 12A has received another downlink HTTP request containing information representing a response to a synchronisation aid request, the processing module 120 takes into account the information representing a response contained in the last downlink HTTP request received if this information is different between the two downlink HTTP requests.

When the number of beacons received by the femto gateway 11 reaches the number of beacons $N_B$, the processing module 110 of the femto gateway 11 passes to a step 50. The femto gateway 11 then waits until it receives a synchronisation frame in the subperiod PS of the next communication period. During step 50, the processing module 110 receives the synchronisation frame. The processing module 110 then knows that this synchronisation frame has been received during a subperiod PS. Through its knowledge of the LoRaWAN protocol, the processing module 110 knows the predefined difference between the subperiod PS and the next beacon sent by each class B gateway in the LoRa network 1 (the macro gateways 12A, 12B and 12C). From the instant of reception of the synchronisation frame and the predefined distance, the processing module 110 determines at least the next instant of sending of a beacon by each class B gateway in the LoRa network 1 (here the macro gateways 12A, 12B and 12C). The processing module 110, knowing the period of the beacons in the LoRa network 1, can then synchronise its own beacon sendings with the beacon sendings of the other class B gateways in the LoRa network 1 (here the macro gateways 12A, 12B and 12C). If the femto gateway comprises a reliable clock, then a single reception of a synchronisation frame suffices to synchronise the beacon sendings of the femto gateway 11. If the clock of the femto gateway is not sufficiently reliable, then the beacon sendings must be synchronised regularly in order to compensate for the clock drifts of the femto gateway 11.

Following the reception of the synchronisation frame during step 50, in a step 51, the processing module 110 transmits a beacon at each sending instant determined during step 50. In other words, the processing module 110 transmits at least one beacon synchronised with the beacons transmitted (not shown in FIG. 3A) by the other class B gateways in the LoRa network 1.

In one embodiment, a plurality of synchronisation frames are transmitted with a predetermined periodicity P. The femto gateway 11 can thus resynchronise at each reception of a synchronisation frame (repetition of steps 49, 50 and 51). The periodicity P is for example a default periodicity known to each gateway in the LoRa network 1. In one embodiment, the periodicity P is defined by the femto gateway 11 and information representing this periodicity is transmitted in the direction of the server 10 in the synchronisation aid request frames. The server 10 next transmits the information representing the periodicity to the gateway in the network 1 designated to help the femto gateway 11 to synchronise itself. In one embodiment, the periodicity P is defined by the server 10 that transmits information representing the periodicity P to the gateway in the network 1 designated in order to help the femto gateway 11 to synchronise itself and to the femto gateway 11.

In one embodiment, the synchronisation frame contains the unique identifier AddID of the gateway for which it is intended, here the femto gateway 11, if the global identifier PingAddID is not present in the information representing a response to the synchronisation aid request. In one embodiment, the synchronisation frame contains the global identifier PingAddID as the destination address if said global identifier PingAddID is present in the information representing a response to the synchronisation aid request.

In one embodiment, the synchronisation frame also contains information representing an instant at which the synchronisation frame was sent by the macro gateway 12A. The instant at which the synchronisation frame was sent enables the femto gateway 11 to calculate a time taken for propagation of the frame between the macro gateway 12A and the femto gateway 11, and to take this propagation time into account during synchronisation. In this way, the synchronisation is made reliable.

It is known that, in a LoRa network, a subperiod of a communication period attributed to a conventional class B end device changes in a deterministic fashion between two beacon sendings. In one embodiment, when the subperiod PS used for transmitting the synchronisation frame coincides with a subperiod attributed for other communications by means of the gateway that is to send the synchronisation frame, here the macro gateway 12A, the processing module 100 of the server 10 designates, temporarily or definitively, another gateway in the LoRa network 1 within range of the femto gateway 11 for sending the synchronisation frames.

In one embodiment, the synchronisation aid is granted, i.e. the synchronisation method described in relation to FIG. 3A is implemented, during a period D. During the period D, the femto gateway 11 transmits beacons and synchronises its beacon transmissions with each synchronisation frame that it receives. In one embodiment, during the period D, the macro gateway 12A periodically transmits a synchronisation frame with the periodicity P. In one embodiment, the period D is a default period known to each gateway in the LoRa network 1. For example, the period D may be equal to 24 hours or infinite. In one embodiment, the period D is fixed by the server 10 and received by the processing module 110 of the femto gateway 11 in the response to the synchronisation aid request during step 45. To do this, the server 10 can analyse traffic due to the class B end device in a geographical area comprising the femto gateway 11 and locate regular periods of affluence (i.e. periods of overloading of the LoRa network 1) during which the macro gateways 12A, 12B and 12C are overloaded. The femto gateway 11 can then be used to relieve the macro gateways 12A, 12B and 12C. The period D can then be defined according to these periods of affluence. In one embodiment, at the end of the period D the femto gateway 11 renews its synchronisation aid request if necessary, by relaunching the method described in relation to FIG. 3A. In another embodiment that is an alternative to the previous one, it is the server 10 that takes the initiative in renewing the synchronisation aid. In this case, the processing module 100 of the server 10 repeats the method described in relation to FIG. 3A as from step 43, and steps 44 to 51 are implemented.

In one embodiment, once the synchronisation aid has started, the processing module 100 of the server 10 observes communications from end devices using the femto gateway 11. In the event of abnormal functioning of these communications, the processing module 100 of the server 10 ends the synchronisation aid without awaiting the end of the period D. Abnormal functioning is characterised for example by a number of repetitions of frames passing through the femto gateway 11 that is greater than a predetermined threshold. The processing module 100 of the server 10 informs the femto gateway 11 of the end of the synchronisation aid, for example by sending it a downlink HTTP request containing information signifying the end of the synchronisation aid or by requesting another gateway in the LoRa network 1 to transmit to the femto gateway 11 a frame containing information signifying the end of the synchronisation aid.

In one embodiment, the synchronisation aid request frames, the synchronisation aid request response frames and the synchronisation frames are frames dedicated to synchronisation aid that supplement existing frames defined in the LoRaWAN protocol.

In one embodiment, the synchronisation aid request frames, the synchronisation aid request response frames and the synchronisation frames are frames existing in the LoRaWAN protocol in which new fields are inserted for transporting information and/or data exchanged when the synchronisation method described in relation to FIG. 3A is implemented.

In one embodiment, the synchronisation aid request frames, the synchronisation aid request response frames and the synchronisation frames are frames existing in the LoRaWAN protocol in which fields not used by the LoRaWAN protocol are used for transporting information and/or data exchanged during the implementation of the synchronisation method described in relation to FIG. 3A.

We saw above that, during steps 40 and 41, the refusal message definitively ended the synchronisation aid process. In an alternative embodiment, the refusal message invites the femto gateway 11 to later renew its transmission of a synchronisation aid request frame. In this case, after a waiting period, for example predefined, following the reception of the refusal message, the femto gateway 11 once again implements step 32 by transmitting a new synchronisation aid request frame.

In one embodiment, prior to the implementation of step 32, the processing module 110 of the femto gateway 11 transmits a first synchronisation aid request, referred to as a preliminary synchronisation aid request, by means of the link 15D without passing through the macro gateways 12A, 12B and 12C. This preliminary synchronisation aid request is transmitted for example in the form of an uplink HTTP request containing the same information as that transmitted during steps 33, 34 and 35. When it receives this uplink HTTP request, the processing module 100 of the server 10 implements a preprocessing procedure enabling the server 10 to determine whether the femto gateway 11 can be enabled to send a synchronisation aid request frame. During this preprocessing procedure, the processing module 100 analyses for example a load on the LoRa network 1 in a geographical area encompassing the femto gateway 11. If the load on the LoRa network 1 due to the class B end devices is higher than a predefined load level, the processing module 100 decides to enable the femto gateway 11 to initiate the implementation of the synchronisation method described in relation to FIG. 3A. To do this, the processing module 100 transmits a downlink HTTP request to the femto gateway 11, indicating to it that it is enabled to send a synchronisation aid request frame. Following reception of this downlink HTTP request, the processing module 110 of the femto gateway 11 implements step 32. If the load on the LoRa network 1 due to the class B end devices is less than or equal to the predefined load level, the processing module 100 sends a refusal message to the femto gateway 11. As described above, this refusal message may be a definitive refusal or an invitation to renew the synchronisation aid request at a subsequent date. The subsequent date may be predefined and known to each gateway in the LoRa network 1, defined by the femto gateway 11 or defined by the processing module 100 of the server 10 and transmitted in the refusal message. In one embodiment, rather than allowing the femto gateway 11 to renew a synchronisation aid request at a subsequent date, the processing module 100 decides, when the load on the LoRa network is less than or equal to the predefined load level, to take into consideration the femto gateway request 11. If, after a given period, the processing module 100 finds that the load on the LoRa network 1 in the geographical area encompassing the femto gateway 11 exceeds the predefined load level, it enables the femto gateway 11 to implement step 32.

In one embodiment, the femto gateway 11 uses the transmission of a preliminary synchronisation aid request to obtain a renewal of the period D if this is not infinite. One advantage of this embodiment is that the renewal of the period D is granted by the server 10 only if the preprocessing procedure enables it. In this way, the implementation of the synchronisation aid procedure is renewed only if the load on the LoRa network 1 justifies it.

Up until then, the initiation of the synchronisation aid procedure was always at the initiative of the femto gateway 11. In one embodiment, the server 10 decides by itself, without prior reception of a synchronisation aid request, to help the femto gateway 11 to synchronise itself so that the femto gateway 11 can function in class B communication mode. This embodiment is for example implemented when, after analysis of the load on the LoRa network 1 due to the class B end devices, the server 10 finds that the LoRa network 1 is overloaded in a geographical area encompassing the femto gateway 11. To do this the server 10, by means of its processing module 100, sends a request to implement step 32 to the femto gateway 11. This request is for example transmitted in the form of a downlink HTTP request, comprising information representing a request to initiate the synchronisation process, transmitted to the femto gateway 11 using the link 15D. Following the reception of this downlink HTTP request, the processing module 110 of the femto gateway 11 implements step 32.

In one embodiment, the femto gateway 11 does not permanently have a unique identifier AddID. The unique identifier is attributed to the gateway 11 by the processing module 100 of the server 10, either during the transmission of the request to initiate the synchronisation aid process (the unique identifier AddID is then included in the downlink HTTP request comprising the information representing a request to initiate the synchronisation aid process), or during the transmission of the downlink HTTP request indicating to the femto gateway 11 that it is enabled to implement the synchronisation aid process (i.e. following the reception by the server 10 of a preliminary synchronisation aid request).

In one embodiment, it is not the femto gateway 11 that defines the subperiod PS. In this case, the synchronisation aid request frame sent by the subgateway 11 does not comprise this information. It is then the processing module 100 of the server 10 that defines the subperiod PS. The processing module 100 then transmits information representing the subperiod PS in the downlink HTTP request comprising information representing a response to the synchronisation aid request transmitted to the macro gateway 12A, said information being intended for the femto gateway 11.

In one embodiment, before sending the synchronisation aid request frame during step 32, the femto gateway 11 checks whether other gateways are within range for receiving said synchronisation aid request frame and for transmitting synchronisation frames to it. Such a check may rely on an analysis of the beacons received by the femto gateway 11. Reception of a beacon signifies that at least one gateway is within range of the femto gateway 11. If no gateway is within range, the femto gateway 11 does not implement the method described in relation to FIG. 3A.

FIG. 3B illustrates schematically a second example of a method according to the invention for synchronising a gateway not having synchronisation means.

The method described in relation to FIG. 3B is very similar to the method described in relation to FIG. 3A and can replace the method described in relation to FIG. 3A. Steps 32 to 43, 45 to 47, 50 and 51 remain identical. Step 44 is replaced by a step 440 implemented by the macro gateway 12A. Step 48, implemented by the macro gateway 12A, is replaced by a step 480 implemented by the server 10. Step 49 implemented by the macro gateway 12A is replaced by a step 490 implemented by the server 10 and by a step 491 implemented by the macro gateway 12A.

In the method described in relation to FIG. 3B, the server 10 transmits a downlink HTP request to the macro gateway 12A for each synchronisation frame. It is therefore the server 10 that completely controls the sending of the synchronisation frames. In this method, the macro gateway 12A serves solely to relay the downlink HTTP request coming from the server 10 to a destination in the LoRa network 1 without caring about the content of said request (conventional functioning of a gateway of a LoRa network). By default any downlink HTTP request contains all the information necessary for the macro gateway 12A in order to form a frame to be sent at an instant determined by the server 10.

During step 440, the downlink HTTP request containing the information representing a response to the synchronisation aid request is received by the macro gateway 12A. The macro gateway 12A extracts said information and inserts it in a downlink frame intended for the gateway corresponding to the unique identifier AddID, i.e. the femto gateway 11, or intended for each gateway identified by the global identifier PingAddID. Said downlink frame is transmitted in multi-broadcast mode. Unlike step 44, during step 440 the macro gateway 12A does not determine in which subperiod PS of at least one communication period said macro gateway 12A must transmit a synchronisation frame and to which destination (AddID or PingAddID). In the method described in relation to FIG. 3B, the femto gateway 11 receives the downlink frame containing the information representing a response to the synchronisation aid request during step 45 already explained.

Following the sending of the downlink HTTP request comprising the information representing a response to the synchronisation aid request, the processing module 100 of the server 10, during step 480, starts a counter, and counts the number of beacons sent following the transmission of said downlink HTTP request. When the number of beacons sent reaches the number of beacons $N_B$, the processing module 100 passes to step 490 during which it transmits a downlink HTTP request containing information representing the sending of a synchronisation frame during the subperiod PS of the next communication period. This downlink HTTP request makes it possible to trigger, during step 491, a sending by the macro gateway 12A of a synchronisation frame in the subperiod PS of the next communication period. The femto gateway 11 implements step 50 following the reception of the synchronisation frame. Step 490 is repeated during the period D.

In the case where the subperiod PS coincides with a subperiod attributed to the macro gateway 12A for communicating a frame, referred to as a conventional frame, other than the synchronisation frame (a frame comprising application data or control information), the server 10 can request the macro gateway 12A to favour the sending of the conventional frame. However, the femto gateway 11 expecting, following the reception of the synchronisation request response frame, to receive a synchronisation frame in the subperiod PS, it uses the conventional frame as a synchronisation frame for synchronising its beacon sendings.

In this embodiment, the server 10 finely controls the duration of the synchronisation aid by controlling when it sends downlink HTTP requests making it possible to trigger the sending, by the macro gateway 1A, of synchronisation frames.

The invention claimed is:

1. A method for synchronising a gateway in a long-range wireless network affording low energy consumption, intended to enable said gateway to function according to a communication mode, known as class B, in which communication periods are defined from periodic emissions of beacons by each gateway in said network supporting said mode, referred to as class B gateways, the beacon transmissions being synchronised between each class B gateway, each communication period being divided into a predefined number of subperiods, an end device of the network functioning in accordance with said mode being able to communicate bidirectionally with a server by means of a class B gateway only during a subperiod that has been allocated to it, the method comprising, when it is implemented by a first gateway:

sending, to said server, by means of at least one second gateway of said network, a first frame comprising a synchronisation aid request;

receiving a second frame comprising information representing a response to said request coming from a gateway in said network, referred to as the designated gateway, equipped with synchronisation means, the designated gateway having been designated by the server among the at least one second gateway, the reception of said second frame enabling the first gateway to determine at least one communication period during which the first gateway must receive a third frame, referred to as the synchronisation frame, coming from said designated gateway;

obtaining information representing a subperiod of each communication period determined used by the designated gateway to transmit a synchronisation frame, said subperiod having a predefined offset from a beacon directly following the communication period;

receiving at least one synchronisation frame; and for each synchronisation frame received: determining, as from an instant of receiving said synchronisation frame and the predefined offset, at least one next instant of sending a beacon for each class B gateway in said network; and transmitting a beacon at each next transmission instant determined.

2. The method according to claim 1, wherein, before sending the first frame comprising a synchronisation aid request, the first gateway checks whether at least one second gateway is within range for receiving said first frame and for transmitting third synchronisation frames to the first gateway, no first frame comprising a synchronisation aid request being sent if no gateway is within range.

3. The method according to claim 1, wherein, following the sending of the first frame comprising the synchronisation aid request, if no response to said first frame is received after a predefined time, the first gateway renews its synchronisation aid request by sending a new fixed frame comprising the synchronisation aid request.

4. A method for synchronising a gateway implemented in a long-range wireless network affording low energy consumption, intended to enable said gateway to function in accordance with a communication mode, referred to as class B, in which communication periods are defined from periodic sendings of beacons by each gateway in said network supporting said mode, referred to as class B gateways, the sendings of beacons being synchronised between each class B gateway, each communication period being divided into a predefined number of subperiods, an end device of the network functioning in accordance with said mode being able to communicate bidirectionally with a server by means of a class B gateway only during a subperiod that was allocated to it, the method being implemented by a system and comprising the method according to claim 1 implemented by a first gateway, implemented by a second gateway, the second gateway being of class B and being equipped with synchronisation means.

5. The method according to claim 4, wherein the frame comprising the synchronisation aid request comprises a unique identifier enabling the server to determine which gateway has made the synchronisation aid request.

6. The method according to claim 4, wherein the subperiod used for transmitting a synchronisation frame is determined by the first gateway and the information representing a response to the synchronisation aid request comprises information representing said subperiod.

7. The method according to claim 4, wherein the subperiod used for transmitting a synchronisation frame is determined by the server and the frame comprising the synchronisation aid request comprises information representing said subperiod.

8. The method according to claim 4, wherein said method is implemented for a predetermined period.

9. The method according to claim 4, wherein a plurality of synchronisation frames are transmitted with a predetermined periodicity.

10. The method according to claim 4, wherein, when the subperiod used for transmitting the synchronisation frame coincides with a subperiod attributed to the second gateway for other communications, the server, temporarily or definitively, designates another class B gateway in said network, equipped with synchronisation means, for transmitting at least one synchronisation frame to the first gateway.

11. The method according to claim 4, wherein, prior to the sending of the frame comprising the synchronisation aid request, the first gateway transmits to the server a preliminary synchronisation aid request using a direct communication link with the server, triggering an implementation by the server of a preprocessing procedure enabling the server to determine whether it can enable the first gateway to transmit the frame comprising the synchronisation aid request.

12. The method according to claim 4, wherein, prior to the sending of the frame comprising the synchronisation aid request, the server sends a request to the first gateway requesting the first gateway to send a frame comprising a synchronisation aid request.

13. The method according to claim 4, wherein the information representing a response to the synchronisation aid request comprises information enabling a plurality of gateways, comprising the first gateway, to determine at least one future instant of sending of a beacon by each class B gateway in said network and to transmit a beacon at each future sending instant determined.

14. The method according to claim 4, wherein the network is a LoRa network.

15. A system comprising at least one device according to claim 14.

16. A device of the gateway type comprising circuitry adapted for implementing the method according to claim 1.

17. A non-transitory storage medium storing a computer program comprising program code instructions which can be loaded in a programmable device to cause said programmable device to implement the method according to any of claim 1.

18. A method for synchronising a gateway in a long-range wireless network affording low energy consumption, intended to enable said gateway to function in accordance with a communication mode, referred to as class B, in which communication periods are defined from periodic sendings of beacons by each gateway in said network supporting said mode, referred to as class B gateways, the sendings of beacons being synchronised between each class B gateway, each communication period being divided into a predefined number of subperiods, an end device of the network functioning in accordance with said mode being able to communicate bidirectionally with a server by means of a class B gateway only during a subperiod that was allocated to it, the method comprising, when the method is implemented by the server:
  receiving at least one request containing a synchronisation aid request made by a first gateway and relayed by at least one second gateway;
  checking feasibility of synchronisation aid, synchronisation aid being possible when at least one gateway among the at least one second gateway is equipped with synchronisation means;
  when synchronisation aid is possible, designating a second gateway, referred to as the designated gateway, equipped with synchronisation means, for relaying to the first gateway information representing a response to the synchronisation aid request, said information making it possible to establish a transmission of at least one frame, referred to as a synchronisation frame, by the designated gateway, to the first gateway, in a predetermined subperiod of at least one communication period, each transmission of a synchronisation frame enabling the first gateway to determine at least one instant of sending of a beacon synchronised with instants of transmission of beacons of each class B gateway in said network; and
  transmitting a request comprising said information to the designated gateway.

19. A device of the server type comprising circuitry adapted for implementing the method according to claim 18.

20. A method for synchronising a gateway in a long-range wireless network affording low energy consumption, intended to enable said gateway to function in accordance with a communication mode, referred to as class B, in which communication periods are defined from periodic sendings of beacons by each gateway in said network supporting said mode, referred to as class B gateways, the sendings of beacons being synchronised between each class B gateway, each communication period being divided into a predefined number of subperiods, an end device of the network functioning in accordance with said mode being able to communicate bidirectionally with a server by means of a class B gateway only during a subperiod that was allocated to it, the method comprising, when the method is implemented by a second gateway in said network, the second gateway being of class B and being equipped with synchronisation means:

- receiving a request from the server comprising information representing a response to a synchronisation aid request made by a first gateway, said request having been relayed by the second gateway to said server;
- transmitting a frame comprising said response to the synchronisation aid request to the first gateway, said response enabling the first gateway to determine in which subperiod of at least one communication period the first gateway must receive a synchronisation frame; and
- transmitting at least one synchronisation frame to the first gateway in said subperiod, a reception of a synchronisation frame in said subperiod enabling the first gateway to determine at least one instant of sending a beacon synchronised with instants of transmitting beacons of each class B gateway in said network.

21. A device of the gateway type comprising circuitry adapted for implementing the method according to claim 20.

* * * * *